D. M. BLISS.
ALTERNATING CURRENT MOTOR.
APPLICATION FILED MAR. 13, 1911.
1,214,883.
Patented Feb. 6, 1917.
2 SHEETS—SHEET 1.
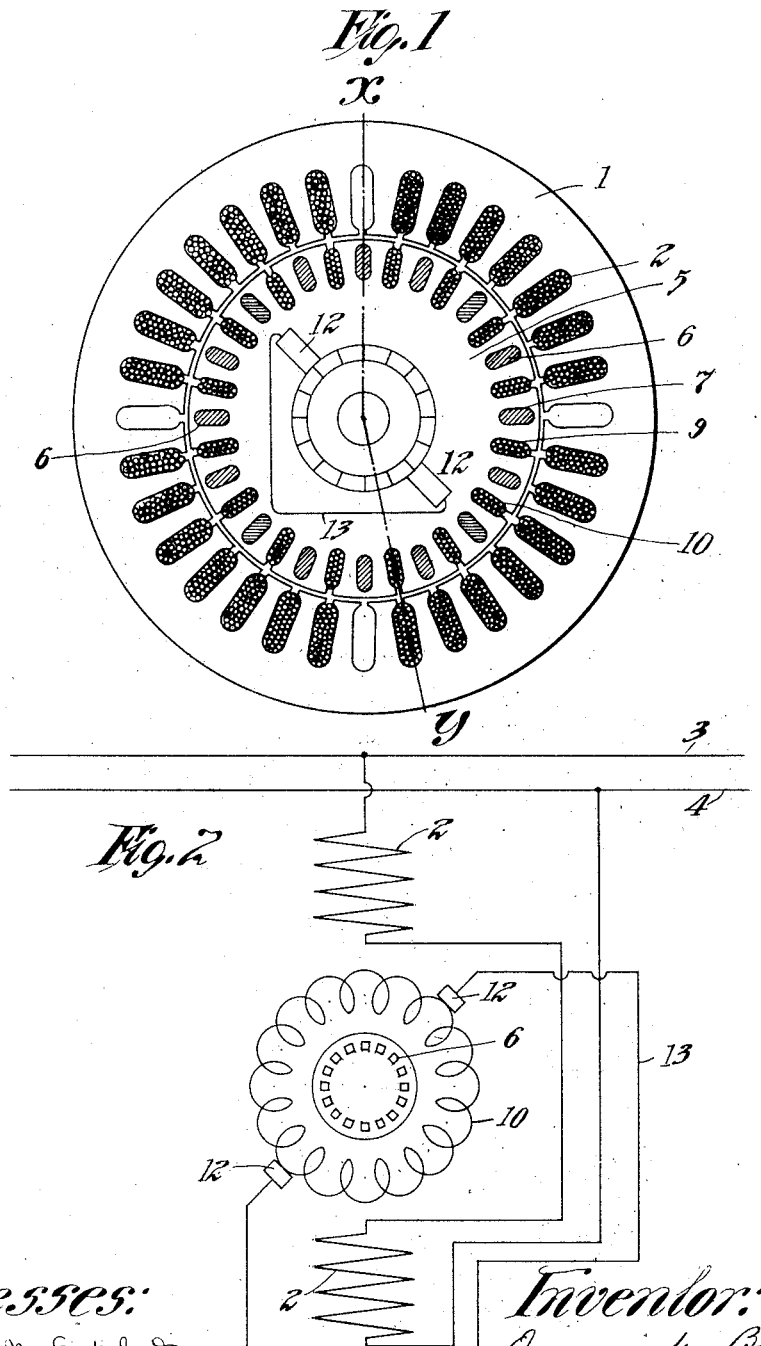

D. M. BLISS.
ALTERNATING CURRENT MOTOR.
APPLICATION FILED MAR. 13, 1911.
1,214,883.
Patented Feb. 6, 1917.
2 SHEETS—SHEET 2.
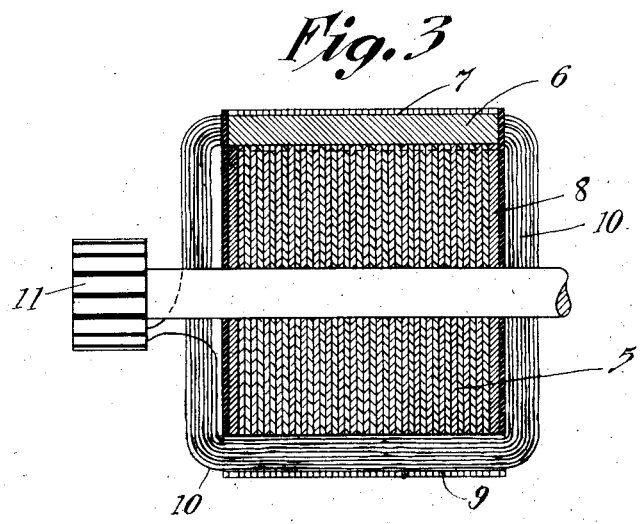
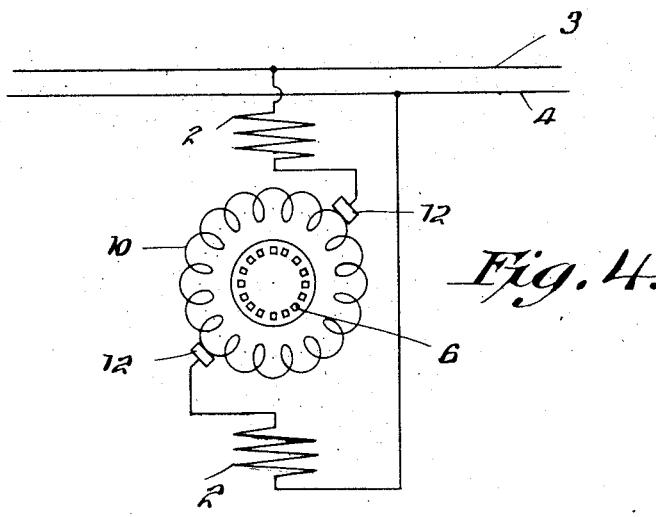

UNITED STATES PATENT OFFICE.

DONALD M. BLISS, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

ALTERNATING-CURRENT MOTOR.

1,214,883.  Specification of Letters Patent.  Patented Feb. 6, 1917.

Application filed March 13, 1911.  Serial No. 614,276.

*To all whom it may concern:*

Be it known that I, DONALD M. BLISS, a subject of the King of Great Britain, and a resident of West Orange, in the county of Essex and State of New Jersey, have invented certain new and useful Improvements in Alternating-Current Motors, of which the following is a specification.

My invention relates generally to alternating current motors, and more particularly to motors adapted to be operated from a single phase alternating current circuit.

As is well known, the ordinary induction motor is not self-starting on a single phase circuit, and various means have been employed to overcome this defect, as, for example, by providing the motor with two separate field circuits, and with so-called "phase splitting" devices whereby the equivalent of a rotating magnetic field is produced, thus enabling a properly arranged armature or rotor to start and attain full speed. In practice, it has been found necessary to provide means for opening the circuit of one of the field windings after the motor has reached full speed, and this is accomplished in the motors now in the market by a centrifugal switch, usually mounted on the rotor or armature shaft and so arranged that when a predetermined speed has been reached, the circuit through the starting winding on the field will be opened, the speed of the motor being thereafter maintained by the action of the main field winding circuit. It has also been found in practice, that a motor of this type having a rotor or armature containing an even number of conductors will not start readily even when provided with "phase splitting" devices, and it is, therefore, necessary to use an odd number of conductors in such motors.

The object of my invention is to produce a simple and efficient, self-starting single phase alternating current motor, which does not involve the use of "phase splitting" devices or centrifugal switches, and which may be driven below, at, or above synchronism.

Another object of my invention is to provide a single phase alternating current motor which combines the advantages of a repulsion or series motor with those of an induction motor, that is to say, a motor capable of developing a strong starting torque and tending to operate at a constant speed.

My improved motor is provided with a commutator and brushes, but the arrangement of parts is such that there is practically no sparking at the brushes under any condition of load. Furthermore, the use of my motor tends to improve the power factor of the alternating current circuit to which it is connected.

My invention consists further in the details of construction and combinations of parts, hereinafter more particularly described and claimed.

In the accompanying drawings, which form a part of this specification, and in which like reference characters refer to like parts in the several views:—

Figure 1 is a view partly diagrammatic and partly sectional of an alternating current motor embodying my invention;

Fig. 2 is a diagrammatic view of the same connected to the alternating current mains, Fig. 3 is a view partly in section of the rotor of the same taken on the line X Y of Fig. 1, and with only one coil of the commutated winding shown, and Fig. 4 is a diagrammatic view similar to Fig. 2 but showing a modified arrangement of connections.

Referring to the drawings, the stator or field frame of the alternating current motor is shown at 1. The field frame may be of any of the forms well known in the art, and is preferably laminated. It may or may not have projecting poles, and is provided with a suitable winding 2, which may be either distributed or concentric. In the drawings I have illustrated a bipolar motor, but obviously my invention is applicable to motors of any number of poles.

In Fig. 2 of the drawing, the field winding 2 is shown connected to the single phase alternating current mains 3, 4. The rotor or armature of the motor is mounted to rotate within the influence of the field produced by the winding 2, and comprises a core 5 of magnetic material which is preferably cylindrical in form and laminated. The core is provided with a squirrel cage system of conductors or windings, which consists preferably of bars 6, of copper or other conducting material, carried in tunnels, or other suitable openings 7, extending axially near the periphery of the core, the said bars being united at their ends by disks or rings 8 of copper or other conducting material in a manner well known in the art. The bars 6, are uniformly distributed around the periphery of the core, and may be of either odd or even number. The core 5 is also provided with another set of slots or other suitable openings 9, equal in number to the openings 7. The openings 9 are also axially extending and uniformly distributed around the periphery of the core and are located between the openings 7, and at approximately the same distance from the periphery of the core as the openings 7. Each opening 9 is preferably located half-way between the adjacent pair of openings 7. The openings 9 are provided with a commutated winding 10, which may be any ordinary form of closed coil armature winding, and which is connected in the usual manner to the segments of the commutator 11. The commutated winding 10 is preferably of high resistance and is insulated from the core. The commutator is provided with brushes 12 which are preferably short circuited by a conductor 13. My invention is, however, not limited to the arrangement of connections shown in Fig. 2 in which the brushes are short circuited, but a series connection may be employed, that is, the field winding and the commutated winding may be connected in series through the brushes across the line, as is illustrated in Fig. 4.

By virtue of the commutated winding, the motor starts as a repulsion or series motor, and after being started, the squirrel cage system of conductors will produce a torque in the same direction of rotation as the commutated winding. The commutated winding tends to keep the motor up to synchronism, and the power factor of the line is therefore improved. The speed may, however, be varied by shifting the brushes, and the motor may be caused to operate below, at, or above synchronism.

It is to be noted that in the arrangement of windings described, substantially all of the magnetic flux threading coils of the commutated winding also threads, or is surrounded by, a portion of the squirrel cage winding. The effect of this arrangement is to suppress sparking at the commutator both during starting and when the motor has reached its normal speed. Owing to the sparkless operation of the motor, the commutated winding may be made up of a large number of turns of fine wire, whereby the starting current is reduced and the use of small brushes permitted thereby reducing the brush losses due to friction and heating, and correspondingly increasing the efficiency of the motor.

The openings which contain the bars of the squirrel cage system of conductors also serve to prevent the distortion of the field flux, which changes in the armature currents tend to produce. This beneficial result is due to the absence of magnetic material in the said openings, whereby the flux density in the magnetic material between the active conductors of the commutated winding is increased.

Having described my invention, what I claim as new, and desire to secure by Letters Patent is:—

1. An armature comprising a core of magnetic material having openings located near the periphery thereof, a squirrel cage system of conductors located in alternate openings, and a commutated winding located in the remainder of the openings, substantially as described.

2. An armature comprising a core of magnetic material having two sets of alternately arranged axially extending openings near the periphery thereof and substantially equidistant therefrom, a closed circuited winding in one of said sets of openings and a commutated winding in the other of said sets, substantially as described.

3. An alternating current motor comprising a stator and a rotor, one of said members being provided with axially extending slots, and having a commutated winding carried in said slots, and short circuited conductors located between said slots, substantially as described.

This specification signed and witnessed this 10th day of March, 1911.

DONALD M. BLISS.

Witnesses:
FREDERICK BACHMANN,
ANNA R. KLEHM.